Feb. 11, 1930.  T. H. O. RICHARDSON  1,746,681
CARBURETOR
Filed July 18, 1927  3 Sheets-Sheet 1

Inventor
T.H.O. Richardson

Patented Feb. 11, 1930

1,746,681

UNITED STATES PATENT OFFICE

THOMAS HERBERT OTTEWILL RICHARDSON, OF ST. ALBANS, ENGLAND

CARBURETOR

Application filed July 18, 1927, Serial No. 206,737, and in Great Britain August 13, 1926.

This invention relates to carburetors for motor car and other internal combustion engines and has for its object the production of a carburetor of improved type in which many of the disadvantages of the older types of carburetor are obviated and whereby a more constant mixture of fuel and air or other gas, such as oxygen, is given to the engine under varying speeds and conditions.

In my improved form of carburetor I dispense entirely with any of the usual forms of main jets and choke tubes and substitute therefor a hollow wing or vane shaped to act as an aerofoil and hereinafter referred to as a wing, mounted in the induction tube in such a way that the wing decreases its incidence to the incoming air as more air enters the induction tube. On part of one surface the wing is perforated or slit which part acts as an atomizer for the fuel. The advantage of this construction is that owing to the position in which the wing is placed and to its shape and mode of movement caused by the air entering the engine, all of which are hereinafter described, the mixture passing to the engine is so regulated that even with widely varying engine speeds and throttle positions the proportion of fuel to air can be kept more constant than in carburetors heretofore used. At the same time owing to the large cross-sectional area of air intake and the aerofoil form of the wing, the induction tube is comparatively unrestricted at maximum engine speeds and the perforated surface of the wing gives efficient atomization of the fuel.

One manner of carrying out my invention is illustrated in the accompanying drawings in which:—

Like references denote like parts in all the figures of the drawings.

In these drawings A represents the float chamber similar to that used in an ordinary carburetor. Attached to the float chamber or made integral therewith is a petrol or other fuel supply reservoir B into which the petrol or other fuel passes from the float chamber by means of an inter-communicating passage arranged at a convenient height to maintain an adequate supply of fuel in the reservoir B. On the face of the reservoir B adjacent to the float chamber is fixed the square-shaped induction tube C (or the tube C may be made integral with the reservoir B). The air used for admixture with the fuel passes upwards through the tube C which is open at the bottom and which may be attached in the usual manner to any filtering or warming device for the air. Towards the bottom of the induction tube C is the hollow wing E which is perforated on the surface away from the air inlet as at F in Figures 1 and 2.

An L-shaped pipe D D' gives a passage for the petrol or other fuel from the reservoir B to the interior of the hollow wing E. The portion D of the said pipe is placed vertically in the reservoir B and is of such a length as to reach nearly to the bottom of the reservoir, the portion D', which is at right angles to the portion D, passes through a bearing in the wall of the reservoir and into the induction tube C and is free to rotate about its own axis. The portion D' there passes into the hollow wing E near its lower end. The wing E is connected to the portion D' with air-tight joints so that the wing E and the portion D' rotate together. In the interior of the wing E part of the pipe D' is cut away so as to give an open connection with the petrol or other fuel reservoir B through the pipe D D'. The fuel level normally stands just below the portion D' of the pipe D D'.

Figure 1:
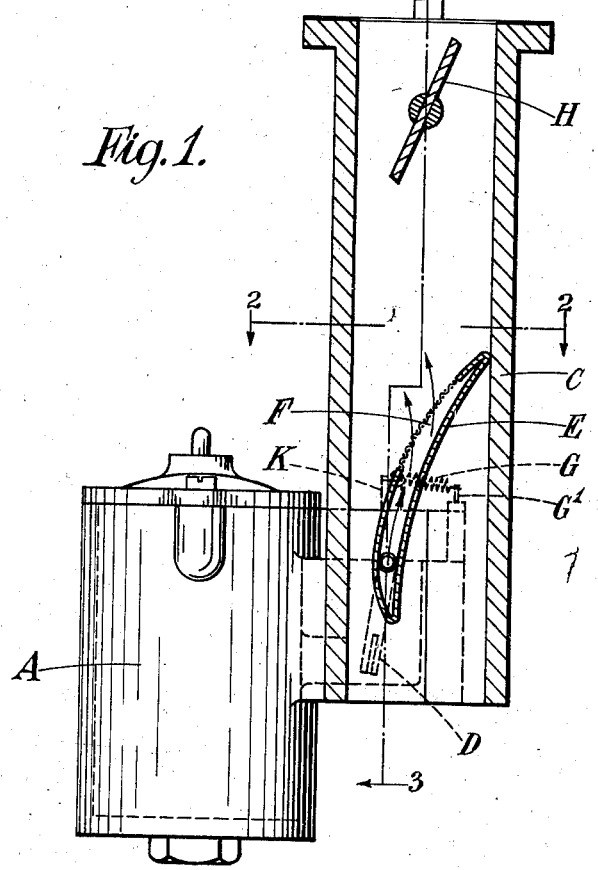
Fig. 1 is a part sectional elevation of an air inlet tube and fuel reservoir taken on the lines 1—1 of Fig. 3.
Figure 2:
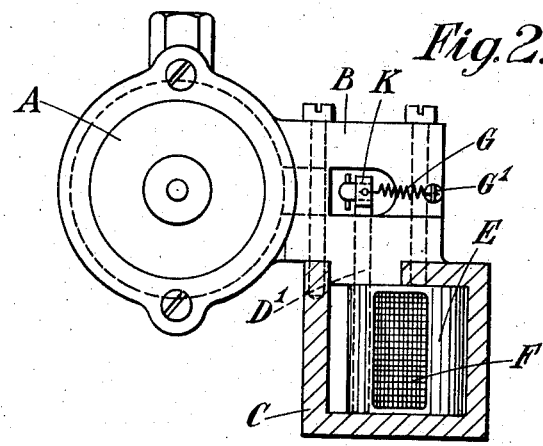
Fig. 2 is a part sectional plan taken on the lines 2—2 of Fig. 1.
Figure 3:
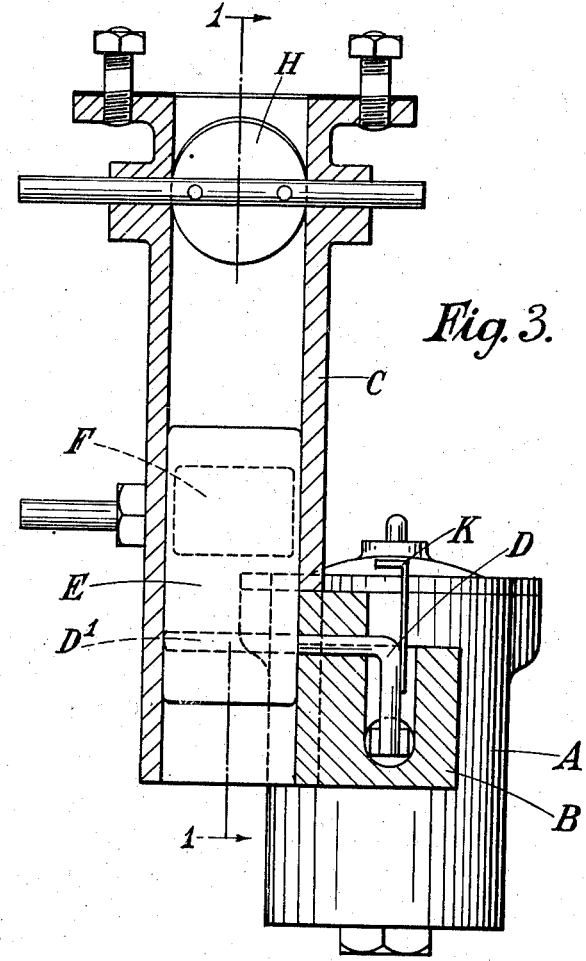
Fig. 3 is a part sectional elevation taken on lines 3—3 of Fig. 1.

The portion D' of the pipe D D' is mounted in such a position that the upper end of E rests against or close to the side of the induction tube C while allowing a passage for air between the lower end of the wing and the other side of the induction tube, so that when the engine is stationary or running at a slow speed there may be practically no passage for air between the upper end of the wing and the side of the induction tube but there is a passage for air between its lower end and the other side of the induction tube as shown in Figures 1 and 2.

In order to control the movement of the wing E, caused by the pressure of the incoming air, a controlling device is used such as the spring G shown in Figure 2 of the drawings. The tension spring G is attached at one end to the projection K at the top of the portion D of the pipe D D' and at the other end to the pin G' on the reservoir B. This spring will tend to keep the upper end of the wing E close to the side of the induction tube C when the engine is stationary. The tension of the controlling device may be made adjustable for the purpose of changing the proportion by volume of fuel to air, which may be rendered necessary, as for instance by a change of temperature or barometric pressure, or for correcting the proportions of fuel to air made necessary by a scarcity of oxygen in the atmosphere such as is experienced at high altitudes. One method of making the tension of the spring adjustable would be to dispense with the pin G' and substitute therefor a horizontal pin which can be brought through the side of the reservoir B in such a way that a control screw can be placed on its outer end, by which the tension in the spring can be varied.

Figure 4:
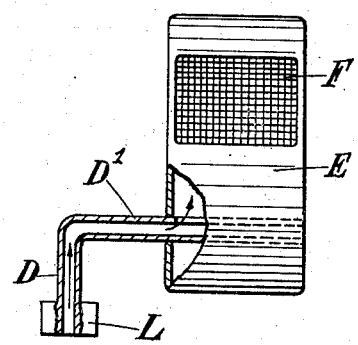
Fig. 4 is a detail part sectional elevation of the wing and fuel supply tube.

As the portion D' of the pipe D D' and the wing E rotate in the operation of the carburetor the bottom of the portion D will move backwards and forwards in the reservoir. If desired a vane L as shown in Figure 4 can be attached to the end of the pipe D so as to steady the movement of the wing or vane E by a dash-pot action.

The improved carburetor operates in the following manner.

When the engine is started the pressure in the induction tube will fall below that of the atmosphere and in consequence a flow of air will commence in the induction tube. The air will pass up the tube C past the perforated face F of the wing E and will create a partial vacuum in and around the perforated face F, owing to the position which the wing takes up and its aerofoil form.

This reduction of pressure will cause fuel to be sucked up into the hollow wing E and to be drawn through the perforations, whereby it is wholly or partially atomized whence it will be carried to the cylinders of the engine mixed with the air. The perforations or slits must be such as to cause atomization of the fuel on its passage out of the wing.

When the throttle H is opened to increase the engine speed, the velocity of the air in the induction tube increases and consequently the reduction of pressure on the perforated surface of the hollow wing is increased. But in order that this increased reduction shall not draw too much fuel through the wing, the wing is moved by the incoming air to assume a position more nearly parallel to the direction of the flow of the air. As the tube and wing E rotate and assume a position more nearly parallel to the flow of the air, the suction over the perforated area of the wing by a given flow of air tends to decrease as the wing is more or less in line with the incoming air, so that the amount of fuel drawn from the atomizing surface F does not increase to the same extent that it would if the wing E were to remain stationary. By means of the spring G or other controlling device the force required to move the wing E can be varied for varying conditions, and the carburetor can be tuned up so as to give the best results for the type of engine used. As the velocity of the air diminishes so the spring, or other controlling device, tends to return the wing to its original position. The spring or controlling device can be so regulated that the proportion of fuel to air in the mixture will remain comparatively constant for the various throttle positions and engine speeds.

Figure 5:
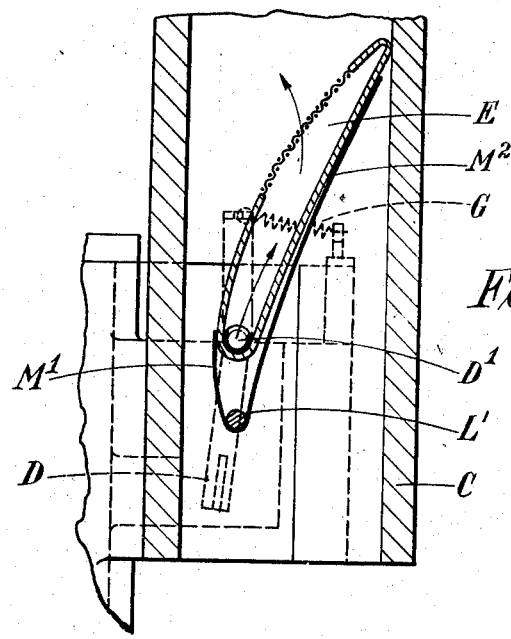
Figs. 5 and 6 are detail views of the hollow wing.
Figure 6:
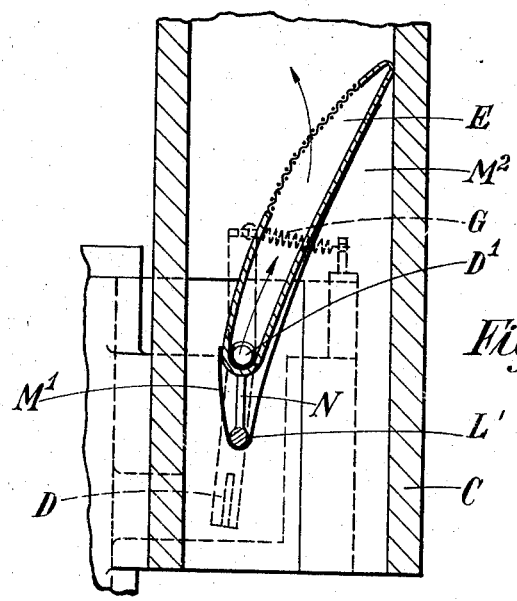

Another form of wing that has been found satisfactory is shown in Figures 5 and 6. Fig. 5 shows a wing with a spring $M'$ $M^2$ whose camber is automatically altered by the alteration in position of the hollow portion of the wing due to the air pressure, while Fig. 6 shows a wing and spring $M'$ $M^2$ in which the camber is adjustable by hand. In Fig. 5 the hollow portion of the wing E which is curved on the perforated side and approximately flat on the other side is mounted on the fuel supply pipe so that its lower edge fits against the portion D' of the fuel supply pipe D D'.

The rod L' is rigidly secured across the induction tube C below, and parallel with the portion D' of the fuel supply pipe, and a bent spring having one short curved arm $M'$ and one long arm $M^2$ is fixed thereon as shown. The spring $M'$ $M^2$ is flat and of a width about the same as that of the hollow portion of the wing. The two arms $M'$ $M^2$ of the bent spring press against and lie along the two sides of the wing forming part thereof, the short arm $M'$ ending just beyond the fuel supply portion D' and the long arm $M^2$ extending along the approximately flat side of the wing E to near its upper end.

When the engine is at rest the long arm $M^2$ of the bent spring is pressed towards the side of the induction tube C under the action of the wing E and its spring G. As soon, however, as the engine is started the movement of the wing E to a position approximately parallel to the flow of the incoming air will be assisted by the tendency of the long arm $M^2$ of the bent spring to straighten. As the short arm $M'$ remains stationary it will be seen that the camber of the wing E alters automatically as the position of the hollow portion of the wing alters.

In the construction shown in Fig. 6 the hollow portion of the wing E is mounted on the portion D' of the fuel supply pipe as in Fig. 5 but is connected to the rod L' by a piece of pliable metal N, the rod L' being free to move in the induction tube C. When it is desired to alter the camber of the wing E, the metal strip N can be bent in any manner desired so as to give the necessary adjustment.

My invention is not limited to the precise examples described or to the details shown in the drawings as many variations can be made therefrom without departing from the scope of my invention.

I claim:—

1. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one wall of the said inlet tube when the engine is at rest, said wing being automatically movable by the air entering the gas inlet tube and having part of one surface perforated, a spring having one end connected to the fuel supply pipe and the other to the side of the fuel supply reservoir for retarding the movement of the wing, and means for varying the camber of the wing.

2. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one wall of the said inlet tube when the engine is at rest, said wing being automatically movable by the air entering the gas inlet tube and having part of one surface perforated, a spring having one end connected to the fuel supply pipe and the other to the side of the fuel supply reservoir, for retarding the movement of the wing, and a bent spring mounted on a rod in the inlet tube below the hollow wing and having its arms lying along the sides of the wing adapted to vary the camber of said wing and spring.

3. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one wall of the said inlet tube when the engine is at rest, said wing being automatically movable by the air entering the gas inlet tube and having part of one surface perforated, a spring having one end connected to the fuel supply pipe and the other to the side of the fuel supply reservoir, and a bent spring, consisting of one long and one short arm, mounted on a rod in the inlet tube, the long arm extending along one side of the wing to near its upper end, and the short arm ending just beyond the fuel supply pipe adapted to vary the camber of said wing and spring.

4. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one wall of the said inlet tube when the engine is at rest, said wing being automatically movable by the air entering the gas inlet tube and having part of one surface perforated, a spring having one end connected to the fuel supply pipe and the other to the side of the fuel supply reservoir, and a bent spring, consisting of one long and one short arm, mounted on a rod in the inlet tube, the long arm extending along one side of the wing to near its upper end, and the short arm ending just beyond the fuel supply pipe, and a pliable metal rod connecting the bent spring rod and the wing to vary the camber of said wing and spring.

5. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one wall of the said inlet tube when the engine is at rest, said wing being automatically movable by the air entering the gas inlet tube and having part of one surface perforated, a spring having one end connected to the fuel supply pipe and the other to the side of the fuel supply reservoir, a bent spring, consisting of one long and one short arm, mounted on a rod in the inlet tube, the long arm extending along one side of the wing to near its upper end, and the short arm ending just beyond the fuel supply pipe to vary the camber of said wing and spring, and a pliable metal rod connecting the bent spring rod and the wing, the fuel supply pipe having a vane fixed to the end remote from the hollow wing.

6. A carburetor for internal combustion engines comprising in combination a gas inlet tube, a fuel supply reservoir mounted adjacent the said gas inlet tube, a fuel supply pipe in open communication with the fuel reservoir and leading into the said inlet tube, and a hollow wing of aerofoil shape mounted within the inlet tube on, and in open communication with the interior of, the said fuel supply pipe, in such position that its end remote from the fuel supply pipe is in proximity to one of the walls of the said inlet tube when the engine is at rest, said wing being automatically movable by the air entering the gas inlet tube and having part of one surface perforated.

7. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, and a hollow wing of aerofoil shape mounted within the inlet tube on, and in open communication with the interior of, the said fuel supply pipe, in such position that its end remote from the fuel supply pipe is in proximity to one of the walls of the said inlet tube when the engine is at rest, said wing being automatically movable by the air entering the gas inlet tube and having part of one surface perforated.

8. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, and a hollow wing of aerofoil shape fixedly mounted at its lower end on, and in open communication with the interior of, the said fuel supply pipe, in such position that its end remote from the fuel supply pipe is in proximity to one of the walls of the said inlet tube when the engine is at rest, said wing being automatically movable by the air entering the gas inlet tube and having part of one surface perforated.

9. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one of the walls of the said inlet tube when the engine is at rest, said wing being automatically movable by the air entering the gas inlet tube and having part of one surface perforated, and means for controlling the movement of the said wing.

10. A carburetor for internal combustion engines comprising in combination a gas inlet tube, a fuel supply reservoir mounted adjacent the said gas inlet tube, a fuel supply pipe in open communication with the fuel reservoir and mounted in the wall of the inlet tube so as to be rotatable about its own axis, a hollow wing of aerofoil shape fixedly mounted at its lower end on, and in open communication with the interior of, the said fuel supply pipe, in such position that its end remote from the fuel supply pipe is in proximity to one of the walls of the said inlet tube when the engine is at rest, said wing being automatically movable by the air entering the gas inlet tube and having part of one surface perforated, and a spring having one end connected to the fuel supply pipe and the other to the side of the fuel supply reservoir.

In testimony whereof I have hereunto set my hand this eighth day of July, 1927.

THOMAS HERBERT OTTEWILL RICHARDSON.